(12) United States Patent
Bock et al.

(10) Patent No.: US 10,502,173 B2
(45) Date of Patent: Dec. 10, 2019

(54) UNIT FOR REGULATING OR CONTROLLING A FLUID PRESSURE

(71) Applicant: MANN+HUMMEL GmbH, Ludwigsburg (DE)

(72) Inventors: Lukas Bock, Bietigheim-Bissingen (DE); Volker Kuemmerling, Bietigheim-Bissingen (DE); Thomas Jessberger, Asperg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 65 days.

(21) Appl. No.: 15/800,765

(22) Filed: Nov. 1, 2017

(65) Prior Publication Data

US 2018/0119660 A1    May 3, 2018

(30) Foreign Application Priority Data

Nov. 2, 2016 (DE) .......................... 10 2016 013 010

(51) Int. Cl.
*F02M 69/26* (2006.01)
*F02B 37/18* (2006.01)
(Continued)

(52) U.S. Cl.
CPC ............. *F02M 69/26* (2013.01); *B29C 65/02* (2013.01); *B29C 66/1312* (2013.01); *B29C 66/542* (2013.01); *B29C 66/5412* (2013.01); *B29C 66/55* (2013.01); *B29C 66/73921* (2013.01); *F01M 13/023* (2013.01); *F02B 37/18* (2013.01);
(Continued)

(58) Field of Classification Search
CPC ...... F02M 69/26; F02M 69/54; B29C 66/542; B29C 66/1312; B29C 65/02; B29C 66/73921; B29C 66/5412; B29C 66/55; B29C 65/48; B29C 66/7212; B29C 66/71; F01M 13/023; F02D 41/0025; F02D 41/1448; F02D 41/0002; F02D 41/3854;
(Continued)

(56) References Cited

U.S. PATENT DOCUMENTS 6,715,733 B2 * 4/2004 Wang ........................ F15C 5/00
                                                                137/859
9,010,729 B2    4/2015 Baumann et al.
2011/0174397 A1 * 7/2011 Goerlich ............ F01M 13/0011
                                                                137/535

FOREIGN PATENT DOCUMENTS

DE           4125156 C1     9/1992
DE         19821324 A1    12/1999
(Continued)

*Primary Examiner* — Joseph J Dallo
(74) *Attorney, Agent, or Firm* — James Hasselbeck (57) ABSTRACT

A unit for regulating or controlling a fluid pressure of a fluid has a housing with at least one housing part and an inlet and an outlet for the fluid. A switching film is connected to the housing part and switches at pressure differences of 1 to 250 mbar relative to an ambient pressure acting on the switching film. The switching film regulates, releases or blocks a flow of the fluid between the inlet and the outlet for the fluid. The switching film is made of thermoplastic synthetic material. An opening cross section of the housing part is closed off by the switching film. In a method for fluid-tightly connecting a switching film to a housing part of the unit, a radial outwardly positioned joining region of the switching film is fluid-tightly pressed against the housing part in the region of joining surface.

25 Claims, 7 Drawing Sheets

(51) Int. Cl.
*F02D 41/00* (2006.01)
*F02D 41/14* (2006.01)
*F02D 41/38* (2006.01)
*F02M 69/54* (2006.01)
*F01M 13/02* (2006.01)
*B29C 65/00* (2006.01)
*B29C 65/02* (2006.01)
*B29C 65/48* (2006.01)

(52) U.S. Cl.
CPC ..... *F02D 41/0002* (2013.01); *F02D 41/0025* (2013.01); *F02D 41/1448* (2013.01); *F02D 41/3854* (2013.01); *F02M 69/54* (2013.01); *B29C 65/48* (2013.01); *B29C 66/71* (2013.01); *B29C 66/7212* (2013.01); *F02D 2041/002* (2013.01); *F02D 2250/08* (2013.01); *Y02T 10/144* (2013.01)

(58) Field of Classification Search
CPC ........... F02D 2250/08; F02D 2041/002; F02B 37/18; Y02T 10/144
See application file for complete search history.

(56) References Cited

FOREIGN PATENT DOCUMENTS

| | | |
|---|---|---|
| DE | 10216661 A1 | 10/2003 |
| DE | 202004015872 U1 | 2/2006 |
| DE | 102015005692 A1 | 11/2016 |
| GB | 1579160 A | 11/1980 |

\* cited by examiner

UNIT FOR REGULATING OR CONTROLLING A FLUID PRESSURE

BACKGROUND OF THE INVENTION

The invention concerns a unit for regulating or controlling a fluid pressure, in particular for the pressure regulation of the internal combustion engine and/or of the crankcase of the internal combustion engine of a motor vehicle, and a method for fluid-tightly connecting a switching film with at least one housing part of the unit.

Pressure regulating valves are used, for example, in the venting line between crankcase and the intake manifold of an internal combustion engine. In this context, the task is to prevent the pressure or vacuum in the containers to be vented from rising beyond a predetermined value.

In internal combustion engines, blow-by gases occur that are generated in that combustion gases in the cylinder bypass the cylinder piston and reach the crankcase. These blow-by gases cause the pressure in the crankcase to rise which may result in leakages and escape of oil. In order to avoid a pressure increase and to discharge the blow-by gases in an environmentally friendly way, the latter are returned from the crankcase into the air intake manifold of the internal combustion engine. On the other hand, the specified vacuum value should not be significantly undershot because otherwise, due to leaks, undesired infiltration air would be sucked into the crankcase.

In case of the pressure regulating valves which are employed currently, usually an element is used that is known to a person of skill in the art also under the term "switching membrane" and is made of elastomer, frequently fluorosilicone rubber (FVMQ). These switching membranes are very flexible due to the specific properties of elastomers. As a function of the applied pressure ratios, this switching membrane opens or closes an opening in the pressure regulating valve. The pressure ratio results usually from the pressure difference between the applied pressure in a first chamber and the pressure present in a second chamber of the pressure regulating valve. The pressure in the first chamber can be, for example, equal to the atmospheric pressure. The switching membrane must react to minimal switching pressures in the magnitude of 1 to 250 mbar.

Blow-by gases in an internal combustion engine are comprised of uncombusted fuel proportions, motor oil proportions, and other pollutants which are produced during the combustion. These gases attack many elastomer types so that damages to the material property may occur. The components of these materials become brittle, porous, and cracked. When the switching films are damaged, the environmentally damaging blow-by gases reach directly the environment because the system is no longer seal-tight. The switching membrane of an elastomer is usually designed as a roll film in order to realize a certain stroke of the switching membrane. The material in the rolling region is mechanically loaded by the rolling movement, while simultaneously being contacted by blow-by gases, and can thus be damaged.

DE 26 29 621 A1 discloses a membrane valve with a switching membrane which is embodied as a switching film clamped at its rim between the housing and the housing cover and, by means of a pressure member, is to be brought into sealing contact on a seat surface provided in the housing, wherein the switching membrane is comprised of a thinner layer of minimal elasticity, for example, of PTFE, that is facing the housing interior and is resistant against aggressive flow media, and comprised of a further thicker layer of elastic rubber material. Such membrane valves are used primarily where a high chemical resistance of the materials coming into contact with the flow medium is required. Since elastic rubber materials do not fulfill this requirement and the chemically resistant materials such as PTFE do not have the required elasticity for proper functioning, films comprised of two layers are employed. By means of the thick rubber-like layer, the contact pressure exerted by the pressure member is transmitted as uniformly as possible to the sealing surface of the switching film interacting with the seat surface in the housing. In this context, for closing the two-layer switching membrane, relatively great switching pressures of several bar are exerted on the switching membrane by a pressure spindle connected with a handwheel in order to ensure the required sealing function by means of the stiff PTFE layer.

SUMMARY OF THE INVENTION

It is an object of the invention to provide a unit for switching at low pressure differences that in operation in an internal combustion engine with aggressive media, in particular so-called blow-by gases, reaches a long service life.

A further object of the invention is to provide a method for fluid-tight connection of a switchable closing element with the unit which in operation in an internal combustion engine with aggressive media, in particular so-called blow-by gases, reaches a long service life.

According to an aspect of the invention, the aforementioned object is solved by a unit for regulating or controlling a fluid pressure, with at least one housing part and a switching film connected with the at least one housing part, wherein the switching film is formed of a thermoplastic synthetic material, for example, PA, PP, or PE, and wherein an opening cross section of the at least one housing part is closed off by the switching film.

According to another aspect of the invention, the further object is solved by a method for fluid-tight connection of a switching film with at least one housing part of a unit wherein the switching film is connected fluid-tightly in the region of at least one joining surface with the at least one housing part.

Beneficial embodiments and advantages of the invention result from the additional claims, the description, and the drawing.

A unit for regulating or controlling a fluid pressure is proposed with at least one housing part and a switching film connected with the at least one housing part for switching at pressure differences of 1 to 250 mbar, preferably of 1 to 100 mbar, relative to an ambient pressure acting on the switching film, and for regulating, releasing or blocking a flow of the fluid between an inlet and an outlet for the fluid, wherein the switching film is formed of a thermoplastic synthetic material and wherein an opening cross section of the at least one housing part is closed off by the switching film.

The unit not only serves for releasing or blocking a flow but regulates between the two switching states "release" or "blocking" the flow of the fluid between the inlet and the outlet by a continuous change of the flow cross section as a function of the pressure difference. In this way, the flow can be throttled.

The film of thermoplastic synthetic material is chemically resistant and can switch many switching cycles of the film valve. The long-term stability of the unit is improved. In particular, a film of thermoplastic synthetic material can be processed by an injection process. Preferably, the switching film is at most 0.5 mm thick, preferably at most 0.3 mm, particularly preferred at most 0.2 mm thick. The switching film can have a diameter between 40 mm and 100 mm, preferably between 50 mm and 80 mm. It is conceivable that for corresponding greater diameters also somewhat higher thicknesses of the switching film in the range of more than 0.5 mm, for example, at most 0.5 mm to 1 mm, can be realized.

A conventional switching membrane of elastomer of a conventional unit for the pressure regulation of an internal combustion engine and/or the pressure regulation of the crankcase of an internal combustion engine is replaced in this context by a switching film of a thermoplastic synthetic material, for example, PA, PP, or PE. This material can be produced, for example, by a sintering process and subsequently can be mechanically machined or can be produced by an injection molding process. In its normal form, such a switching film of thermoplastic synthetic material is stiff and actually not suitable for flexible components. The thermoplastic synthetic material exhibits excellent chemical resistance and can be used in a very broad temperature range. However, the elastic modulus increases very strongly toward low temperatures in comparison to elastomer materials. For this reason, thermoplastic synthetic material is rather not suitable for a use as a switching film in the temperature range that is required for automotive applications in an internal combustion engine of typically −40° C. to +150° C. This disadvantage is advantageously avoided in the unit according to the invention by an advantageous geometry and optionally by extremely thin wall thicknesses of the switching film. By a reduction of the wall thickness to a few tenths of a millimeter in a region which is movable for proper use of the switching film, wherein the designated sealing region that is immobile in itself as well as the clamping region of the material can however be embodied thicker, and by a specially developed geometry of the switching film without rolling region, as it is otherwise conventionally used in the prior art, the stiff material is brought into a shape in which it exhibits the required flexibility but, despite of this, fulfills the mechanical requirements with regard to crack formation, stretching, and bending fatigue strength. Due to the special geometry, no rolling movement takes place anymore but instead a bending movement with a radius change that can be realized with low stretch or even practically without stretching of the material can be realized, and a lifting movement of the switching film for the unit according to the invention can be realized with this bending movement.

The switching film can comprise a plate-shaped flat body, in particular can be formed as a plate-shaped flat body, with a bending region that surrounds a central closure region, wherein the bending region, when switching the switching film, moves the closure region by a low-stretch bending movement, i.e., for practical application practically stretch-free, in particular stretch-free, relative to a valve seat in axial direction, i.e, in the direction of the normal of the flat body, toward the valve seat or away from the valve seat. Since the switching film in this configuration can bend not only in a small surface area but across a large surface area due to the plate-shaped form, individual regions of the switching film are only minimally, or practically not at all, stretch-loaded. The bending movement is thus executed across a large region of the switching film and therefore with minimal elastic deformation in the form of a curvature change with minimal stretching, for example, less than 10%.

The closure region of the switching film can interrupt the flow of the fluid between the inlet and the outlet. The switching film, for example, can be contacting with its sealing region immediately on a sealing seat in order to interrupt the flow.

The switching film for this purpose can be movable between its respective maximal positions in the open and closed state in that atmospheric pressure is applied as control pressure to one side of the switching film. Advantageously, the switching film can be self-regulating and the switching film can be indirectly closed by a pressure difference between atmospheric pressure in the one chamber of the unit and a working pressure of the other chamber of the unit. The working pressure can be, for example, a pressure in a crankcase of an internal combustion engine.

Advantageously, the switching film can be moveable alternatively between its respective maximal positions in the open and closed state in that a control pressure different from an atmospheric pressure is applied to one side of the switching film and/or a mechanical actuation means for switching the switching film is provided.

By means of a spring element which is supported on the at least one housing part, a force is applied in this context onto the switching film in order to be able to adjust the regulating behavior of the unit in a suitable way. For this purpose, the outlet, at an end which is arranged in the housing part, can have a valve seat which is closable by the closure region of the switching film so that a conveyance of the fluid from the inlet to the outlet can be regulated. The spring element exerts in this context the suitable counterforce on the switching film in order to achieve the regulating behavior of the unit in the desired pressure range. The side of the switching film which is facing away from the fluid to be regulated is loaded usually with atmospheric pressure in this context.

According to the invention, an opening cross section of the at least one housing part of the unit is fluid-tightly closed off by an effective region of the switching film. In this way, the flow of the unit can be effectively regulated, released, blocked or throttled. The rim region of the switching film which is surrounding the effective region enables a fluid-tight connection of the switching film of a fluorine and carbon comprising polymer to the housing of the unit, which can be beneficially manufactured of synthetic material, for example, glass fiber reinforced polyamide (PA), and represents a further great advantage relative to the prior art in which impermeable or closed membranes do not lay claim to seal-tightness but are only connected with form fit to the housing. Due to the fluid-tight connection, a region of the unit is sealed as a sealing region and in this way the function of the unit, for example, as a pressure regulating valve is advantageously ensured because the switching film can seal fluid-tightly one housing part, respectively, in that it is connected with the housing part seal-tightly, as well as seal interior chambers of two housing parts relative to each other when the first housing part is closed with a second housing part, for example, with a housing cover.

According to an advantageous embodiment, radially outwardly at least one circumferentially extending joining surface can be provided on at least one housing part on which the switching film is connected with the at least one housing part, in particular fixedly and fluid-tightly connected. By the connection of the switching film with the radially outer circumferentially extending joining surface, the central inner region of the switching film as a whole can freely move in axial direction and, as a sealing region of the switching film, exert in this way the actual switching function of the unit, for example, as a pressure regulating valve. Due to the fluid-tight connection of the switching film to at least one housing part, it can also be effectively avoided that possible gas emissions of the material can escape to the environment.

According to an advantageous embodiment, a radial outwardly positioned joining region of the switching film can be glued to the at least one housing part, in particular can be glued with material fusion and/or glued with form fit. An adhesive connection with material fusion and/or form fit of the switching film with the joining surface of the housing part can ensure the fluid-tight sealing action of the opening cross section of the housing part as well as the fixed and permanent connection of the switching film for a reliable function during operation of the unit. As an adhesive, for example, conventional adhesives, for example, liquid silicones or acrylic-based adhesives can be employed.

According to a particularly advantageous embodiment, in the joining surface of the at least one housing part at least one circumferential groove for receiving an adhesive bead can be provided. In this way, the adhesive bead can be received expediently in the groove and, when applying and pressing the switching film onto the housing part, can thus be distributed in a targeted fashion on the joining surface of the housing part and the joining region of the switching film so that a fluid-tight and permanent connection can be achieved.

According to an alternative advantageous embodiment, a radial outwardly positioned joining region of the switching film can be connected with the at least one housing part by at least partial melting of the joining region of the switching film and/or of the joining surface of the housing part, in particular with material fusion and/or form fit. A connection of the switching film with material fusion and/or form fit by partial melting of the material, for example, by welding, with the joining surface of the housing part can ensure the sealing action of the opening cross section of the housing part as well as the fixed, fluid-tight, and permanent connection of the switching film for a reliable function during operation of the unit. By partial melting, it is possible that one of the joining partners, the joining region of the switching film or the joining surface of the housing part, melts and at least partially bonds with the respective other joining partner. Alternatively, it is also possible that both joining partners partially melt and the melted materials mix and fixedly bond with each other in this way upon solidification. Moreover, it is also possible that only the housing part is partially melted and in this way melted material of the housing part adheres to the switching film. In this way, no direct mixing of the materials takes place. In this way, however, a connection with partial material fusion and partial form fit can be achieved.

According to a further advantageous embodiment, in the joining surface of the at least one housing part at least one circumferential groove for receiving melted material of the joining region and/or of the joining surface can be provided wherein in particular a circumferential groove can be provided radially inside the joining surface of the at least one housing part and a circumferential groove radially outside of the joining surface of the at least one housing part for receiving melted material of the joining region and/or of the joining surface. The melted and projecting material can in this way be received expediently in the groove and, when applying and pressing the switching film onto the housing part, can thus be distributed in a targeted fashion in the groove so that the joining region of the switching film and joining surface of the housing part adhere directly to each other, whereby a fluid-tight and permanent connection can be achieved. In particular, in this way the melted material which is in excess, can flow away to both sides of the joining location and distribute in the grooves so that the joining region of the switching film and joining surface of the housing part can adhere directly to each other.

According to an advantageous embodiment, a radial outwardly positioned joining region of the switching film can be fluid-tightly pressed against the joining surface of the at least one housing part. A fluid-tight pressing of the switching film against the joining surface of the housing part can ensure the fluid-tight sealing of the opening cross section of the housing part as well as the permanent connection of the switching film for a reliable function during operation of the unit. The pressing action can be realized, for example, by a second housing part or in that the first housing part with the switching film is pressed fluid-tightly against a counter member of another component.

Advantageously, the switching film can comprise at least in the region of the joining region an activated surface, in particular at least one activated surface which is facing a first chamber of the first housing part. In preparation of the pressing action, it can be beneficial to pretreat and to activate the surface of the switching film in the region where it is going to be pressed in order to change the surface tension. Such an activation can expediently comprise one or several methods such as etching, plasma treatment, mechanical roughening, embossing, perforating or similar suitable methods. In this way, the contact between joining surface and switching film can be improved. In particular, it is beneficial to subject a surface of the switching film which is exposed to the fluid, for example, as it is the case in the first chamber of the first housing part, to a treatment by activation.

According to an advantageous embodiment, a radial outwardly positioned joining region of the switching film can have on at least one side that is facing the joining surface a connecting element, which connecting element can be connected with the at least one housing part, in particular with material fusion and/or with form fit. The material fusion connection of the switching film or of the connecting element with the joining surface of the housing part can ensure the fluid-tight sealing action of the opening cross section of the housing part as well as the fixed and permanent connection of the switching film for a reliable function during operation of the unit. The connecting element in this context can be a component that is fixedly connected to the switching film. Alternatively, the connecting element itself can represent a housing part or a portion of the housing part. For a material fusion connection, for example, a sintering process can be employed. Alternatively, it is also conceivable to realize the connecting element as a separate injection molded plastic part. Preferably, the connecting element is formed as one piece together with the thermoplastic switching film, for example, produced by an injection molding process.

Preferably, one of the components connecting element, housing part and/or the switching film can be embodied as sintered part and/or as 3D printed part.

According to an advantageous embodiment, a radial outwardly positioned joining region of the switching film can be connected with the at least one housing part by foam material, in particular with material fusion and/or with form fit. A connection with material fusion and/or with form fit of the switching film with the joining surface of the housing part can ensure the fluid-tight sealing action of the opening cross section of the housing part as well as the fixed and permanent connection of the switching film for a reliable function during operation of the unit.

The switching film, which has been advantageously subjected beforehand to a surface treatment, can be connected with at least one connecting element, for example, a housing part. In this context, the foam material can have been attached chambered by a tool such as an additional cover, or a separate holding-down element that is required only for the process step, or chambered by a housing part, or by free foaming. The foam material is to be understood as a material composition which can have been introduced in the aggregate state solid or liquid. After application, the foam material activates itself or by external action and increases its volume. For example, the foam material can be activated thermally. After completion of the activation process, the foam material can be elastic, non-elastic, flexible, or hard.

According to an advantageous embodiment, in the joining surface of the at least one housing part at least one circumferential groove for receiving the foam material can be provided. The foam material in this way can be received expediently in the groove and, after foaming, when pressing the switching film against the housing part, can be distributed in this way in a targeted fashion on the joining surface of the housing part and the joining region of the switching film so that a fluid-tight and permanent connection can be achieved.

In particular, in the joining surfaces of the two housing parts advantageously one circumferential groove each for receiving the foam material can be provided wherein the grooves, when the housing is closed, are positioned axially opposite each other and/or radially displaced. The foamed material which expands after activation and greatly increases its volume can thus be received in the grooves to both sides of the joining location so that the two housing parts, despite of this, clamp the switching film with their joining surfaces and can fluid-tightly adjoin each other. In this way, a permanent and reliable fluid-tight connection between housing and switching film or a reliable fluid-tight closure of the opening cross section of the unit can be achieved.

According to an advantageous embodiment, the connecting element can be formed of synthetic material. Advantageously, the connecting element can enclose both sides of the joining region of the switching film and/or enclose or close it off in radial outward direction by injection molding or embedding with synthetic material. In this way, the joining area can be embedded beneficially with its radial outer rim in the connecting element. In this way, a fixed and permanent connection of switching film and connecting element can be achieved. Alternatively, a switching film can be injection molded onto the connecting element or the connecting element can be produced together with the switching film as one piece in a manufacturing process, for example, by injection molding.

Advantageously, the housing part which has the opening cross section fluid-tightly closed off by the switching film can be fixedly welded to another housing part, for example, a cover, or the housing part can be welded to another component. In this way, a further fluid-tight closure of the unit for reliable operation, for example, as a pressure regulating valve, can be achieved. The joining surface can be expediently designed for welding such that weld beads due to the process of welding do not impair the connection of the housing parts.

According to an advantageous embodiment, the joining surface of the at least one housing part can be designed so as to be self-adjusting in a longitudinal direction. In particular, the joining surface can be formed in upward or downward direction conically or curved or corrugated. Due to the self-adjusting joining surface, a particularly good connection of another housing part as well as of the switching film with automatic centering of the first housing part or of the switching film prior to and during the process of connecting can be ensured.

According to an advantageous embodiment, radially within the joining surface of the at least one housing part, at least one radial circumferential groove can be provided which, inwardly in radial direction, is delimited by a rim for supporting the switching film for axial movements transverse to the opening cross section, wherein in particular two axially opposed and/or radially displaced grooves with a rim, in particular a rolling rim, can be provided. By a rolling radius on the rim, dynamic movements of the switching film with its effective region can be advantageously supported upon carrying out the function in the pressure regulating valve and, at the same time, a protection from damage by the movement of the switching film can be achieved. During its switching movement, the switching film is contacting in this context always at least one rim, preferably however two rims at the same time. In order to prevent damage of the switching film during the joining process, for example, by impermissible compression of the switching film by the rims, the rims can be radially displaced relative to each other. In this way, a realization of a connection is simplified in which the switching film is contacting two rims at the same time. A movement on the boundary surface to an edge can thus be precluded. The rim can be optimized for the film movement so that the switching film in operation is protected substantially from damage by the rim. Also, it is possible to adjust a pretension of the switching film by means of these rims.

According to an advantageous embodiment, a housing with the first housing part and a second housing part can be provided and by means of the switching film the first chamber can be fluid-tightly separated from a second chamber. In this way, the second chamber of the unit can be loaded with atmospheric pressure. For an effective regulating behavior of the unit, the switching film should be able to move as freely as possible, for which reason the second chamber, which by means of the switching film is separated from the first chamber in which the fluid to be regulated is located, is expediently in communication with the environment, i.e., the atmospheric pressure.

According to an advantageous embodiment, the joining region of the switching film can be arranged to be fluid-tightly compressed between the joining surfaces of the two housing parts when the housing is closed. In this way, the opening cross section of the at least one housing part is closed off fluid-tightly, i.e., the switching film is reliably secured for operation and permanently fixed. At the same time, the housing of the unit is also fluid-tightly closed off.

According to an advantageous embodiment, the joining region can be fluid-tightly pressed against one of the joining surfaces by means of a pretensioning element. The pretensioning element ensures that the contact pressure on the switching film is maintained even during operation when minimal movements of the housing parts may occur. Also, by the pretensioning element, a possible flow of the material of the switching film, which may occur in particular under thermal loads, and thus a change of the thickness of the switching film can be compensated. In this way, a reliable function of the unit in operation can be permanently ensured in that the pretensioning force during operation can be readjusted by means of the pretensioning element.

According to an advantageous embodiment, the pretensioning element can be arranged on a side of the switching film which is facing away from the fluid. It is beneficial when the pretensioning element is not in contact with the fluid to be regulated. As a pretensioning element, for example, an elastomer O-ring can be used beneficially. The material of such an O-ring may react sensitively to aggressive gases as they may occur in blow-by gases of an internal combustion engine and may become degraded under such a load. Therefore, it is advantageous when the O-ring is protected from the aggressive fluid in that it is arranged on the side of the switching film which is facing away from the fluid.

According to an advantageous embodiment, the two housing parts can be connected, in particular by means of screwing, clamping or welding of at least one of the housing parts, radially outside of the joining surface. When the switching film is compressed between the two housing parts, in particular by means of a pretensioning element, the two housing parts are expediently fixed relative to each other by means of tensioning elements, screws, clamping elements or the like. Alternatively, it is also possible to weld the two housing parts to each other in order to produce and maintain a permanent connection between the two housing parts.

Advantageous for embodying the switching film from thermoplastic synthetic material is a polyamide material (abbreviation PA) or polypropylene (abbreviation PP) or polyethylene (abbreviation PE). The thermoplastic synthetic material can contain conventional fillers that further improve the properties. Or it can be used without additives as a switching film.

According to an advantageous embodiment, the switching film can be made of thermoplastic synthetic material of a fluorine and carbon comprising polymer material polytetrafluoroethylene (PTFE), or polytetrafluoroethylene with admixtures, or thermoplastically processible polytetrafluoroethylene.

According to a further aspect of the invention, a method for fluid-tight connection of a switching film with at least one housing part of a housing of a unit is proposed, wherein the switching film is formed of a thermoplastic synthetic material and wherein a radial outwardly positioned joining region of the switching film in the region of at least one joining surface is fluid-tightly pressed against the at least one housing part. The method comprises in this context placing the switching film onto the at least one housing part with the joining region above the joining surface, followed by pressing the joining region against the joining surface, in particular by means of a pretensioning element. After compression of the switching film with the housing part, a permanent and fluid-tight connection of the switching film to the housing part and thus a fluid-tight closure of the opening cross section of the housing part can be achieved in this way.

Advantageously, the joining region of the switching film can be pretreated by at least one of the methods etching, plasma treatment, mechanical roughening, embossing, perforating. In preparation of the pressing action, it is beneficial to pretreat and activate the surface of the switching film in the region where it is to be pressed which can be beneficially achieved with one of the aforementioned methods. In this way, the surface tension can be modified so that the contact between joining surface and switching film can be significantly improved.

Expediently, the joining region can be fluid-tightly pressed by means of a pretensioning element against the joining surface. The pretensioning element ensures that the contact pressure of the switching film is maintained during operation in which minimal movements of the housing parts can occur. Also, by means of the pretensioning element, a possible flow of the material of the switching film, which may occur in particular under thermal load, and thus a change of the thickness of the switching film can be compensated. In this way, a reliable function during operation of the unit is ensured permanently in that the pretensioning force during operation can be readjusted by means of the pretensioning element.

According to an advantageous embodiment, after placing the switching film onto the at least one first housing part with the joining region above the joining surface, a second housing part can be placed onto the switching film and in this way a housing can be formed, wherein the joining region of the switching film, when closing the housing, is compressed in the area of the joining surface. By the compression, for example, a greater strength of the connection can be achieved. Also, in this way the fluid-tight connection can be beneficially improved. The second housing part in this context can be expediently adhesively connected with the switching film and/or with the first housing part. Alternatively, it is also conceivable to weld together the two housing parts, which can be made of synthetic material, for example, glass fiber reinforced polyamide (PA), radially outside of the switching film.

According to an advantageous embodiment, the two housing parts, in particular radially outside of the joining surface, can be connected with the respective other housing part, in particular by screwing, clamping or welding. When the switching film is compressed between the two housing parts, in particular by means of a pretensioning element, the two housing parts are expediently fixed relative to each other by tensioning elements, screws, clamping elements or the like.

Advantageously, in this way the two housing parts can be welded to each other or adhesively connected in order to produce and maintain a permanent connection between the two housing parts. Advantageously, the housing can be closed at a radial outer circumference by means of welding or gluing after compression of the switching film. In addition, in this way the housing part, in which the opening cross section is fluid-tightly closed off by the switching film, can be fixedly welded or glued to another housing part, for example, a cover, or the housing part can be welded or glued to another component. In this way, a further fluid-tight closure of the unit can be achieved for a reliable operation, for example, as a pressure regulating valve. The joining surface for welding or gluing can be expediently configured such that the weld beads or adhesive beads due to the process of welding or gluing do not impair the connection of the housing parts and/or the connection of the switching film with the housing parts.

Expediently, the switching film can be axially supported by at least one radial circumferential groove extending radially within the joining surface in the at least one housing part which is delimited in radial direction inwardly by a rim, in particular a rolling rim, for supporting the switching film upon axial movements transverse to its cross sectional surface. In this way, dynamic movements of the switching film as it performs the function in a pressure regulating valve can be advantageously supported and, at the same time, a protection from damage by the movement of the switching film can be achieved. During its switching movement, the switching film contacts in this context always at least one rim, preferably however two rims at the same time. In order to prevent damage of the switching film during the joining process, for example, by an impermissible compression of the switching film by the rims, the rims can be radially displaced relative to each other. In this way, a realization of a connection is simplified in which the switching film is contacting two rims at the same time. A movement on the boundary surface adjoining an edge can thus be precluded.

The rim can be optimized for the film movement so that the switching film in operation is protected from damages by the rim.

According to an advantageous embodiment, the switching film can be axially supported by two grooves arranged in the housing and having a rim, which are oppositely positioned relative to each other or radially displaced relative to each other. In this further embodiment, the rims of the housing parts can be displaced relative to each other in order to not crush the switching film in this region during the joining process. Also, it is possible to adjust the pretension of the switching film by means of these rims.

According to a further aspect of the invention, the unit according to the invention is used for pressure regulation of an internal combustion engine and/or for pressure regulation of a crankcase of an internal combustion engine.

BRIEF DESCRIPTION OF THE DRAWINGS

Further advantages result from the following description of the drawings. In the drawings, embodiments of the invention are illustrated. The drawings, the description, and the claims contain numerous features in combination. A person of skill in the art will expediently consider the features also individually and combine them to meaningful further combinations.

DESCRIPTION OF PREFERRED EMBODIMENTS

In the Figures, same or same type components are identified with same reference characters. The Figures show only examples and are not to be understood as limiting.

Figure 1:
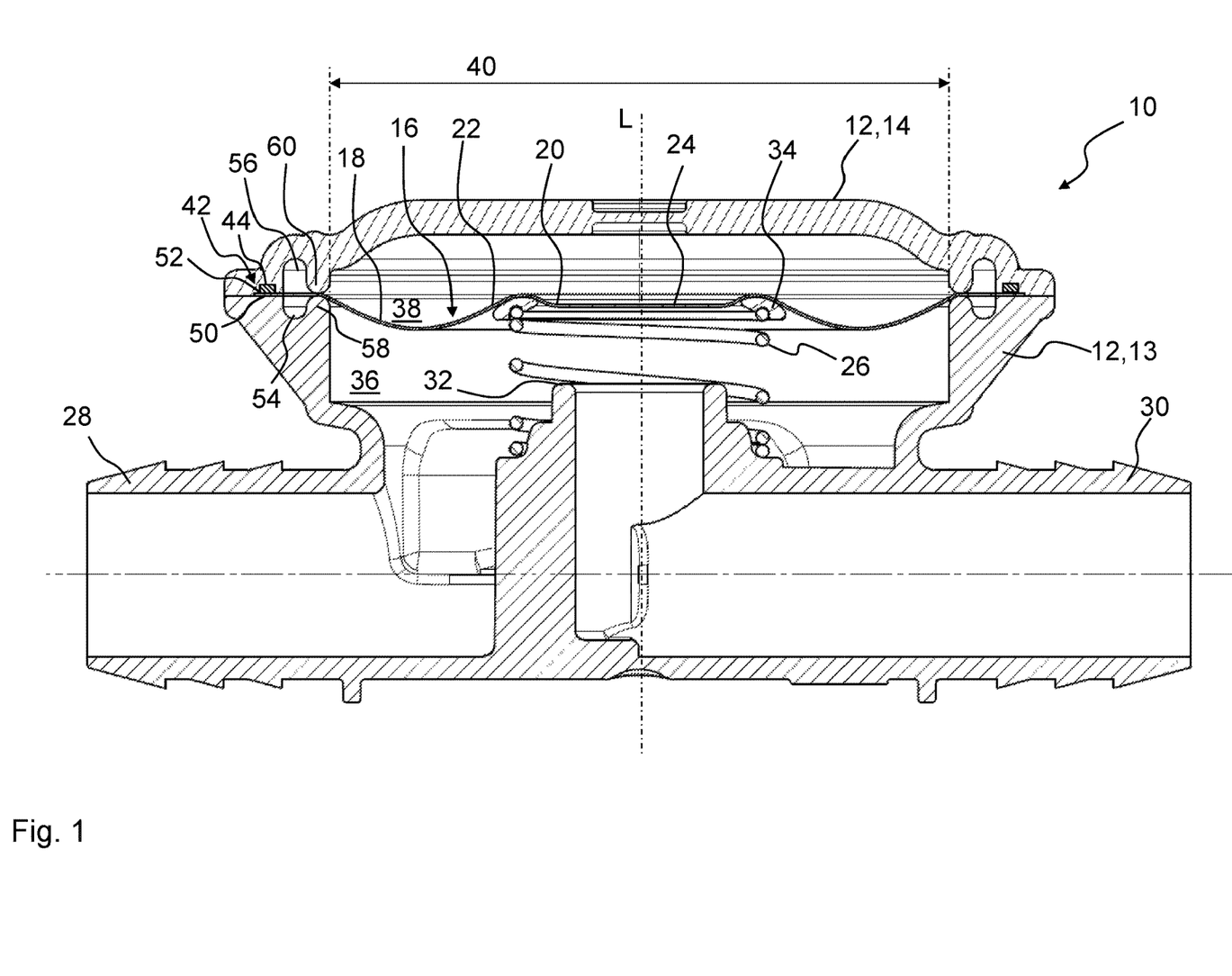
FIG. 1 shows a unit with a switching film of thermoplastic synthetic material according to an embodiment of the invention in a section illustration.

FIG. 1 shows in a section illustration a unit 10 for regulating or controlling a fluid pressure by means of a switching film 22 of thermoplastic synthetic material according to an embodiment of the invention. This unit 10 serves for regulating or controlling a fluid pressure, in particular for use for pressure regulation of an internal combustion engine and/or for pressure regulation of a crankcase of an internal combustion engine. The unit 10 comprises a housing 12 with a first housing part 13 and a second housing part 14 (housing cover), wherein the first housing part 13 comprises an inlet 28 and an outlet 30 for the fluid. The switching film 22 is formed of a thermoplastic synthetic material, for example, PA, PP, or PE, and is clamped with a joining region 42 between the first housing part 13 and the second housing part 14.

Figure 2:
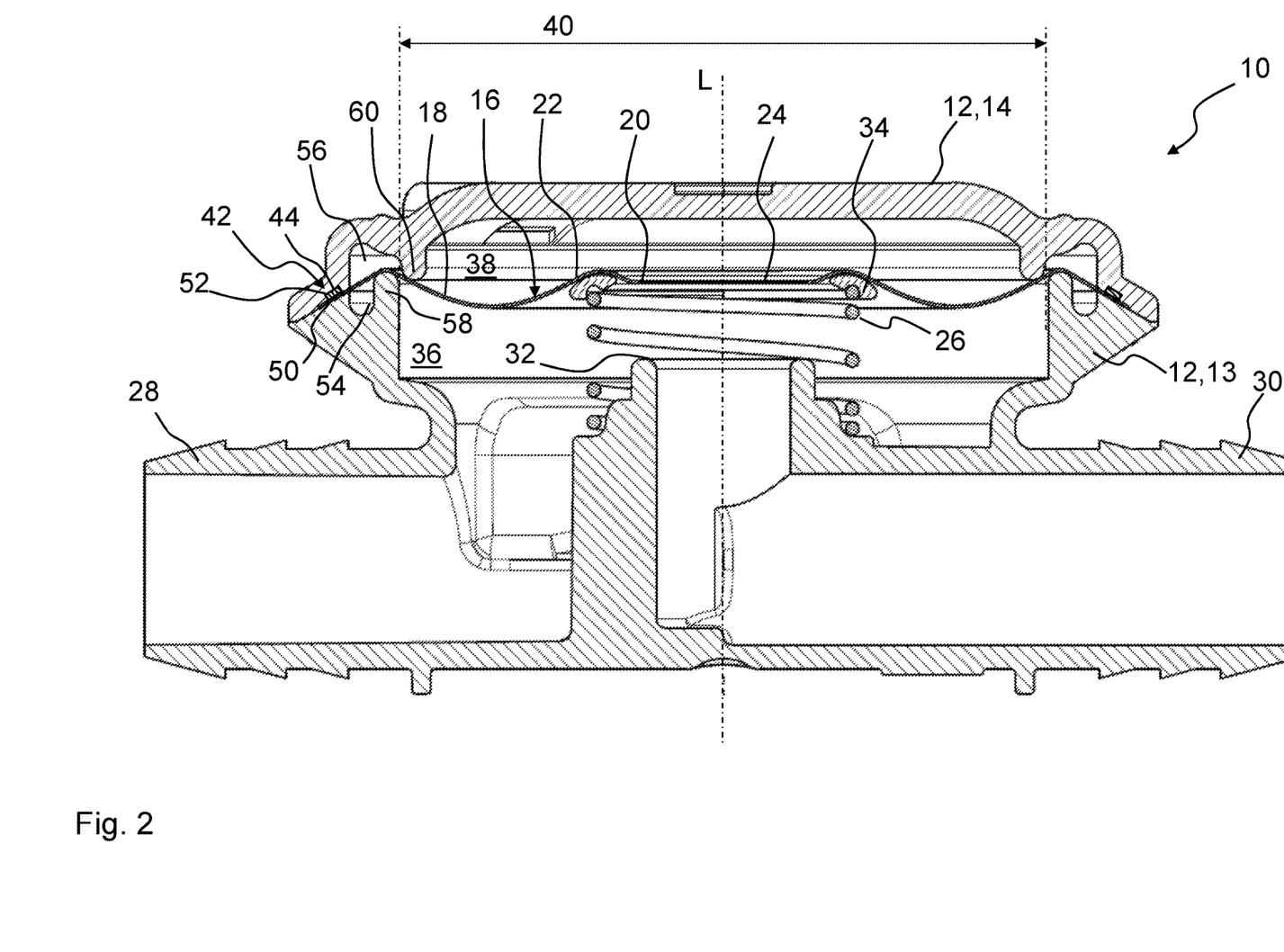
FIG. 2 shows a unit with a switching film according to a further embodiment of the invention in a section illustration.

The opening cross section 40 of the two housing parts 13, 14 is closed off by the switching film 22 with its effective region. Radially outside, two circumferential joining surfaces 50, 52 are provided on the two housing parts 13, 14 where the switching film 22 is fluid-tightly connected with the two housing parts 13, 14. In the illustrated embodiment, a radial outwardly positioned joining region 42 of the switching film 22 is fluid-tightly pressed against the joining surfaces 50, 52 of the two housing parts 13, 14. In the embodiments of FIGS. 1 and 2, the clamping elements 44 are schematically illustrated, respectively. Details in regard to clamping of the switching film 22 by means of the clamping elements 44 can be taken from FIGS. 9 through 15.

The switching film 22 fluid-tightly separates a first chamber 36 of the unit 10 from a second chamber 38. A pressure difference exists between the first chamber 36 and the second chamber 38 wherein the second chamber 38 is in communication (not illustrated) with the environment, i.e., the atmospheric pressure. The switching film 22 can be moved with pressure differences of 1 to 250 mbar, preferably of 1 to 100 mbar, and serves for releasing or blocking a flow of the fluid between the inlet 28 and the outlet 30. In use, the inlet 28 of the unit 10 is fluidically connected, for example, with the crankcase of an internal combustion engine while the outlet 30 is fluidically connected with the intake manifold. The switching film 22 comprises a plate-shaped flat body 16 with a corrugated bending region 18 that surrounds a central closure region 24. When switching the switching film 22, the bending region 18 moves by a low-stretch, in particular stretch-free, bending movement the closure region 24 relative to a valve seat 32 in axial direction L toward the valve seat 32 or away from the valve seat 32. The switching film 22 comprises for this purpose at least in the bending region 18 a thickness of at most 0.5 mm, preferably of at most 0.3 mm, particularly preferred of at most 0.2 mm. The diameter of the switching film 22 is in this context between 40 mm and 100 mm, preferably between 50 mm and 80 mm.

The bending region 18 extends in radial direction in a corrugated shape about the closure region 24 wherein a depression on one flat side corresponds to an elevation on the other flat side of the switching film 22. The closure region 24 closes off the valve seat 32 when it is resting against the valve seat 32. A spring element 26 is provided which is supported on the first housing part 13 and exerts a force on the closure region 24 of the switching film 22. The spring element 26 in this context is supported by an annularly configured plate 34 on the closure region 24. The closure region 24 is configured as a cup-shaped bulge 20 of the switching film 22 wherein the plate 34 in the form of a support ring surrounds this bulge in an annular shape. The spring element 26 alternatively can engage the switching film 22 without plate 34 and can be embedded by injection molding at its end face which is facing the bulge 20 for protecting the switching film 22 so that the embedding could replaces the plate 34. The closure region closes against the valve seat (32) when the switching film switches by executing a bending movement towards the valve seat (32) in response to a pressure difference between the first chamber and the second chamber. The spring element (26) is arranged in the first chamber (36) and has a first end at and surrounding the valve seat (32) and second end at and acting on the closure region (24) of the switching film (22), the coil spring urging the closure region away from the valve seat (32).

Radially within the joining surface 50, 52 of the two housing parts 13, 14, a radial circumferential groove 54, 56 is provided which is delimited in radial direction inwardly by a rim 58, 60 for supporting the switching film 22 upon axial movements transverse to the opening cross section 40. The two grooves 54, 56 are axially opposite each other. Since the switching film 22 is resting on the rounded rims 58, 60 and is clamped between them, the switching film 22 is protected from excessive wear and damages by sharp edges upon axial movements of its effective region due to the regulating function of the unit 10.

FIG. 2 shows in a section illustration a unit 10 with a switching film 22 according to a further embodiment of the invention. The basic configuration of the unit 10 corresponds substantially to the embodiment of FIG. 1. The joining surfaces 50, 52 of the two housing parts 13, 14 are however conically formed in the longitudinal direction L. In this way, upon joining of the switching film 22 to the first housing part 13 and upon assembly of the housing 12 by attaching the second housing part 14, the switching film 22 can be advantageously centered. In contrast to the embodiment of FIG. 1 where they are positioned axially opposite each other, the grooves 54, 56 with their rims 58, 60 are radially displaced which also may have a beneficial effect for the support of the switching film 22 during axial movement of the switching film 22.

Figure 3:
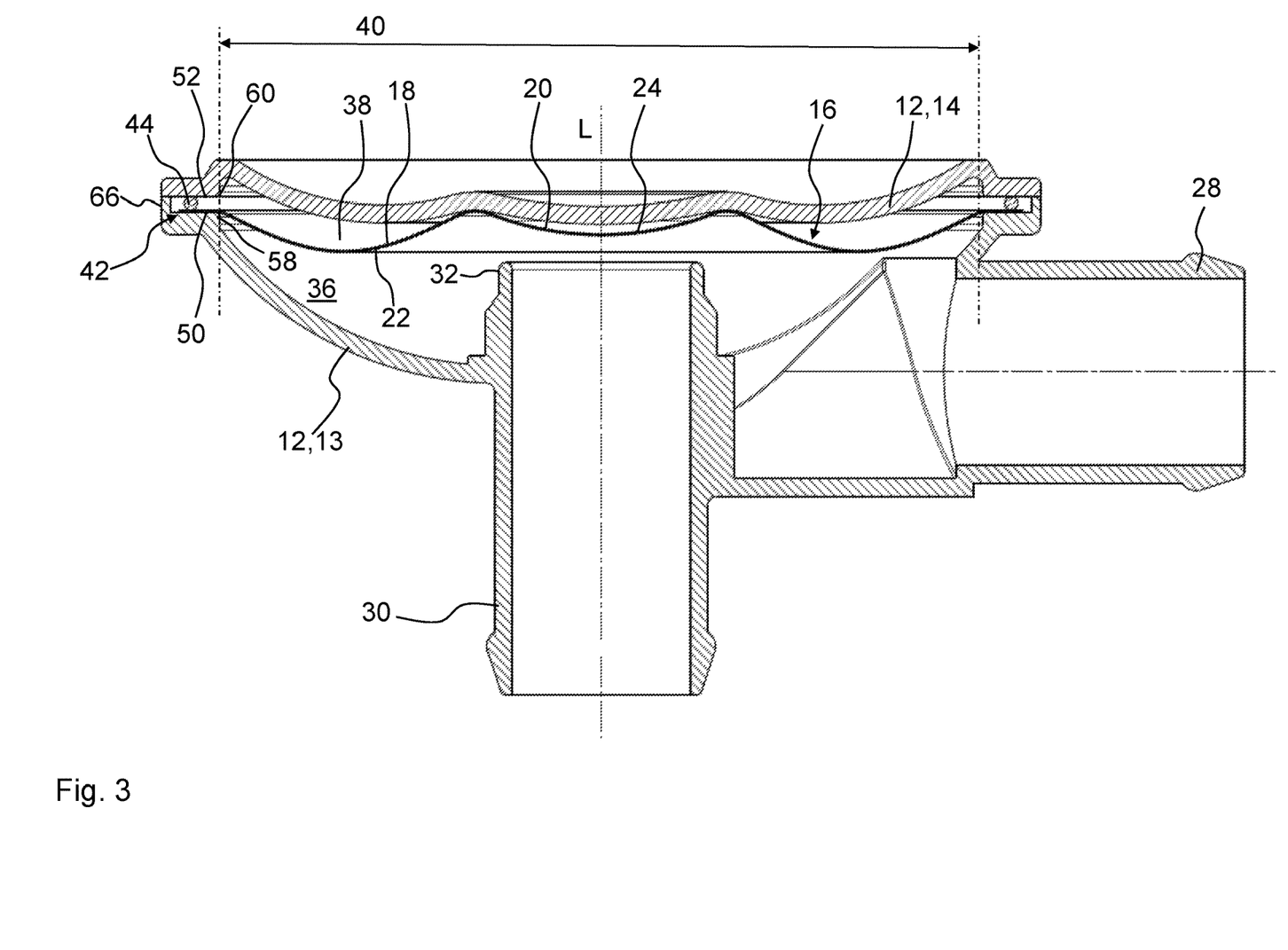
FIG. 3 shows a unit with switching film according to another embodiment of the invention in a section illustration in uncompressed state of the switching film.
Figure 5:
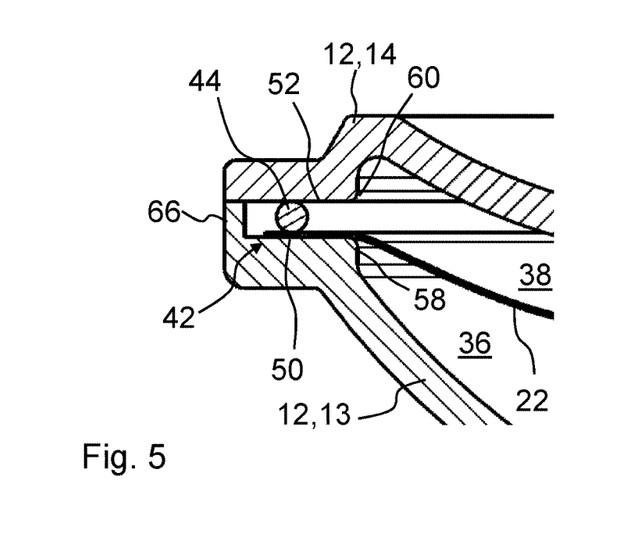
FIG. 5 shows a detail of the joining region of the unit of FIG. 3 in section illustration in uncompressed state of the switching film.

In FIG. 3, a unit 10 with fluid-tightly pressed-on switching film 22 according to another embodiment of the invention is illustrated in section. The spring element 26 has been omitted for clarity. In FIG. 5, a detail of the housing 12 of the unit 10 of FIG. 3 with the joining region 42 is illustrated.

In contrast to the two embodiments of FIGS. 1 and 2, in the unit 10 in FIG. 3 no grooves 54, 56 are provided. The switching film 22 is fluid-tightly clamped between the two housing parts 13, 14. Rims 58, 60 with a rolling radius for relief of the switching film 22 are however provided.

A radial outwardly positioned joining region 42 of the switching film 22 in the region of the joining surfaces 50, 52 is fluid-tightly pressed against the first housing part 13 in that the switching film is placed onto one housing part 13 with the joining region 42 above the joining surface 50 and the joining region 42 is pressed against the joining surface 50, 52 by means of a pretensioning element 44, for example, an O-ring. In this context, the switching film 22 can advantageously have, at least in the region of the joining region 42, an activated surface with modified surface tension in order to obtain a good sealing action, wherein the joining region 42, for example, can be pretreated by one of the methods etching, plasma treatment, mechanical roughening, embossing, perforating. After placing the switching film 22 onto the at least one first housing part 13 with the joining region 42 above the joining surface 50, a second housing part 14 is placed onto the switching film 22 and the housing 12 is formed in this way. When closing the housing 12, the joining region 42 of the switching film 22 is compressed in the region of the joining surface 50, 52.

Figure 4:
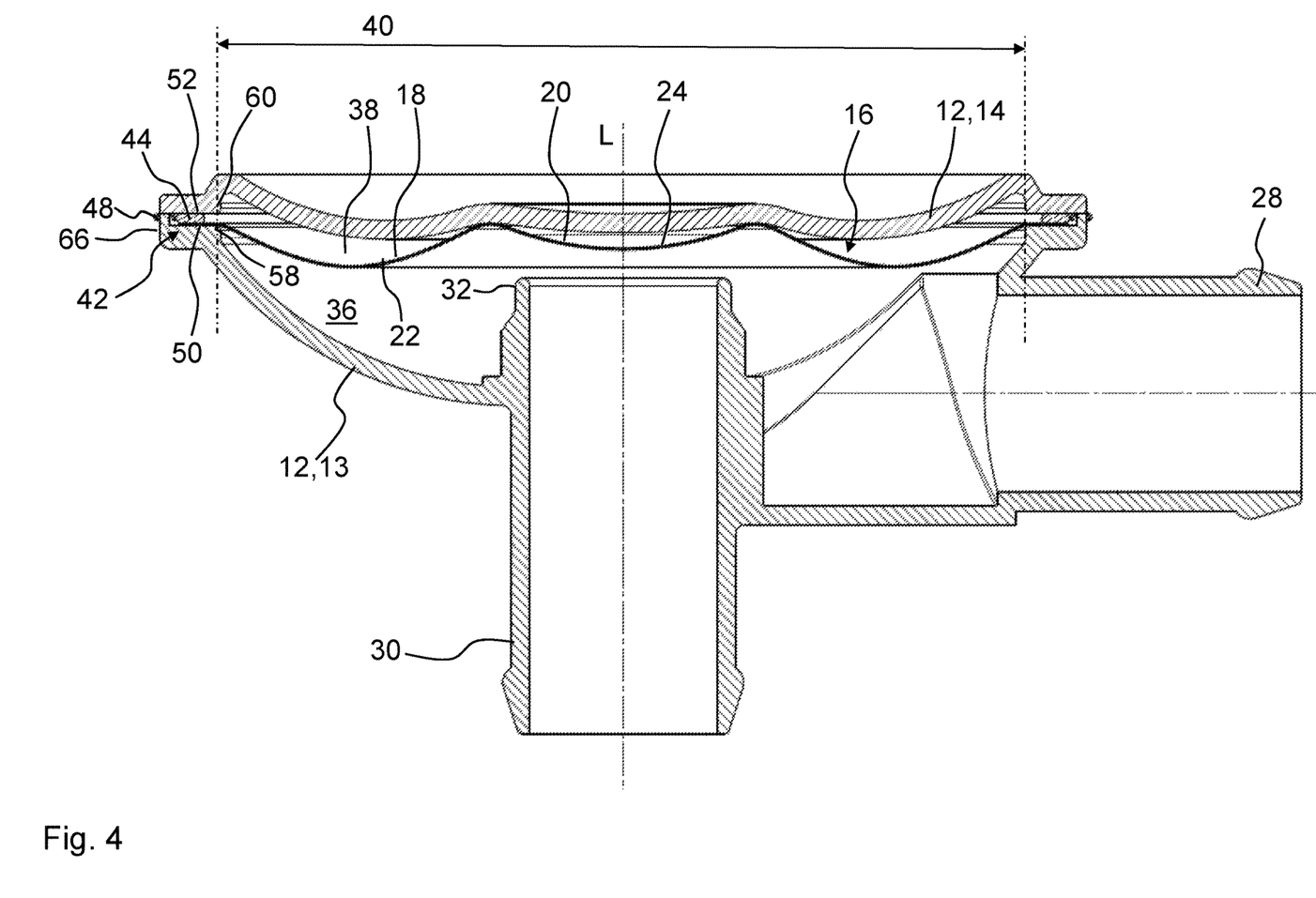
FIG. 4 shows the unit of FIG. 3 with welded housing in a section illustration.
Figure 6:
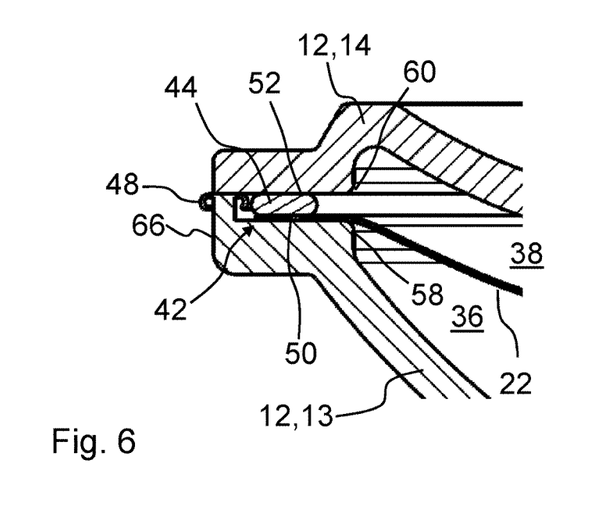
FIG. 6 shows a detail of the joining region of the unit of FIG. 4 with pressed-on film.

FIG. 4 shows the unit 10 of FIG. 3 with welded housing 12. In FIG. 6, a detail of the housing 12 of the unit 10 of FIG. 4 with the joining region 42 is illustrated.

The housing 12 is closed off preferably by means of welding on a radial outer circumference after insertion and slight compression of the switching film 22 by the pretensioning element 44. For this purpose, the at least one housing part 13, 14 is embodied radially outside of the joining surface 50, 52 for closure of the opening cross section 40 by means of welding. For this purpose, the first housing part 13 has a circumferential rim 66 which is provided in order to be welded to the second housing part 14.

When comparing the details illustrated in FIGS. 5 and 6, it can be clearly seen that the two housing parts 13, 14, immediately after placement of the switching film 22 and placement of the second housing part 14, are spaced apart by the circumferential rim 66 of the first housing part 13 which disappears only after welding the two housing parts 13, 14 together by melting of the material so that thereby the two housing parts 13, 14 are seal-tightly resting on each other and the switching film 22 is compressed therebetween by means of the pretensioning element 44. Upon readjusting the spacing between the two housing parts 13, 14 during welding, the pretensioning element 44 is compressed increasingly due to the pressure on the two housing parts 13, 14. The melted material of the rim 66 can flow away as a weld bead to both sides of the rim 66.

Figure 7:
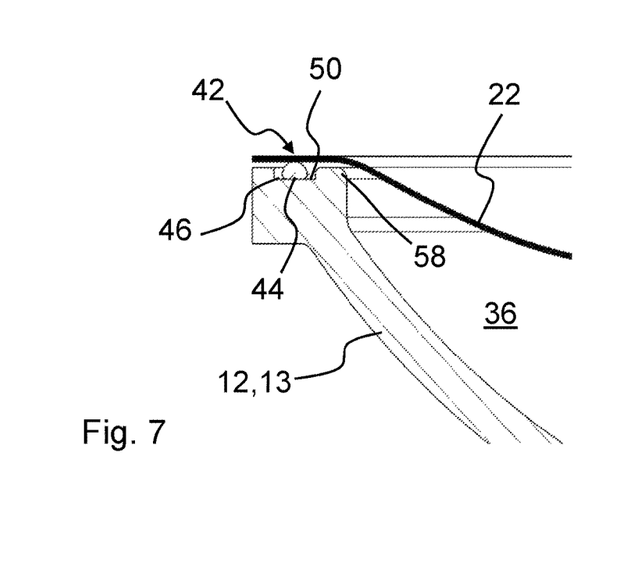
FIG. 7 shows a simplified detail of the joining region of a unit according to a further embodiment of the invention with a housing part in section illustration in uncompressed state of the switching film.
Figure 8:
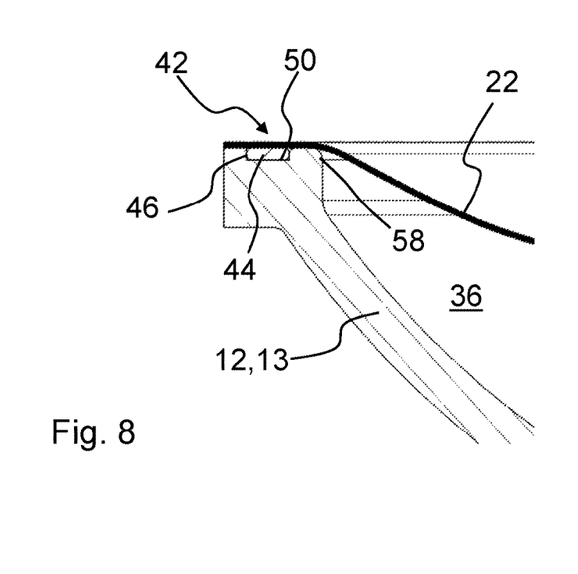
FIG. 8 shows the simplified detail of the joining region of the unit of FIG. 7 in section illustration in compressed state of the switching film.

The two FIGS. 7 and 8 show a simplified detail of the joining region 42 of a unit 10 according to a further embodiment of the invention with a housing part 13 in section illustration in the uncompressed state of the switching film 22.

In this embodiment, the pretensioning element 44 is positioned in the groove 46 which is arranged in the joining surface 50 of the housing part 13 and is better secured in this way during assembly of the unit 10. The switching film 22 is then placed with the joining region 42 on top of the pretensioning element 44 and can be compressed in this way by the second housing part 14 when closing the housing 12. The pretensioning element 44 is then compressed in the groove 46 and can expand in the groove 46 parallel to the switching film 22 in radial direction. FIG. 8 shows the pressed-on switching film 22 with compressed pretensioning element 44 but without illustration of the second housing part 14. Alternatively, the first housing part 13 with switching film 22 placed on top can also be pressed against another component of an internal combustion engine for operation.

Alternatively, the groove 46 can also be arranged in the second housing part 14 so that, as in the embodiment of FIGS. 3 and 4, the pretensioning element 44 can be arranged still between the switching film 22 and the second housing part 14.

Figure 9:
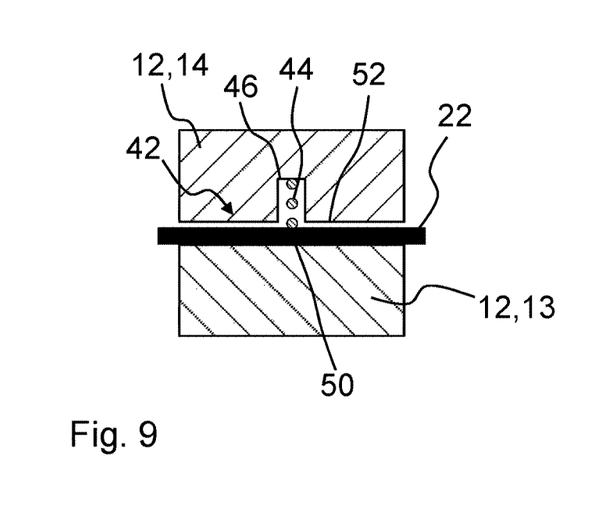
FIG. 9 shows in schematic illustration a joining region with a switching film compressed by a springy pretensioning element according to a further embodiment of the invention.

In FIG. 9, a schematic illustration of a joining region 42 with a switching film 22 compressed by means of a springy pretensioning element 44 according to a further embodiment of the invention is shown. The pretensioning element 44, for example in the form of a spring element, is arranged in a groove 46 which is arranged in the joining surface 52 of the second housing part 14 and is thus fixed for assembly. The switching film 22 is positioned with its joining region 42 between the two housing parts 13, 14 and can thus be advantageously compressed by means of the pretensioning element 44 and the joining surfaces 50, 52 in order to achieve a fluid-tight sealing action of the opening cross section 40 and of the housing 12.

Figure 10:
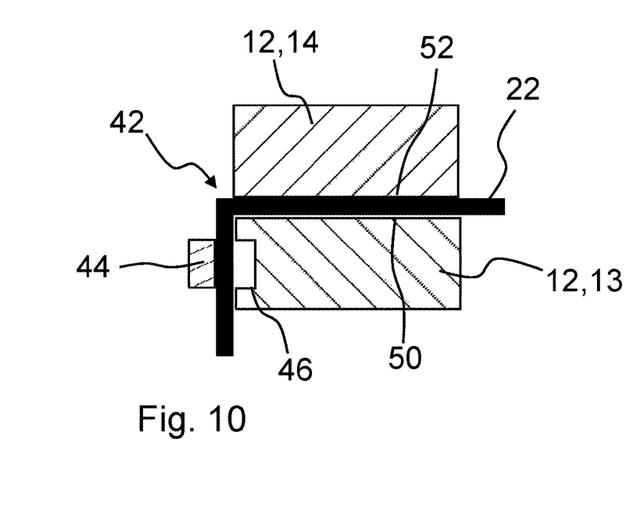
FIG. 10 is a schematic illustration of a joining region with a radially clamped switching film according to a further embodiment of the invention.

FIG. 10 shows a schematic illustration of a joining region 42 with a radially clamped switching film 22 according to a further embodiment of the invention. In this context, the switching film 22 is also compressed between the joining surfaces 50, 52 of the two housing parts 13, 14 and additionally is radially clamped and secured by means of a pretensioning element 44, for example, in the form of a retaining ring, a hose clamp or a snap hook, which is arranged radially on an outer side. The pretensioning element 44, when being clamped, can plunge into a radially arranged groove 46 in the first housing part 13 and can compress the switching film 22 in the groove 46 in this way.

Figure 11:
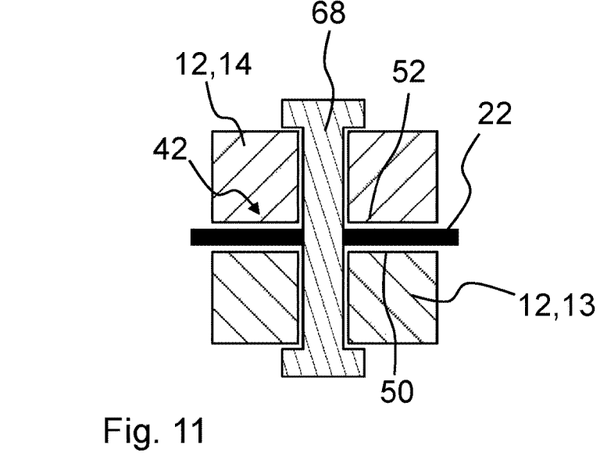
FIG. 11 shows in schematic illustration a joining region with housing parts connected by a screw connection according to a further embodiment of the invention.

FIG. 11 shows a schematic illustration of a joining region 42 with housing parts 13, 14 that are connected by a screw connection 68 according to a further embodiment of the invention. The switching film 22 is compressed between the two housing parts 13, 14 which are connected by means of the screw connection 68. The screw connection 68, for example in the form of a screw with a nut as a counter member, is extended through an opening in the switching film 22. In this way, the switching film 22 can be reliably clamped and a fluid tight connection between the housing parts 13, 14 as well as of the opening cross section 40 can be realized.

Figure 12:
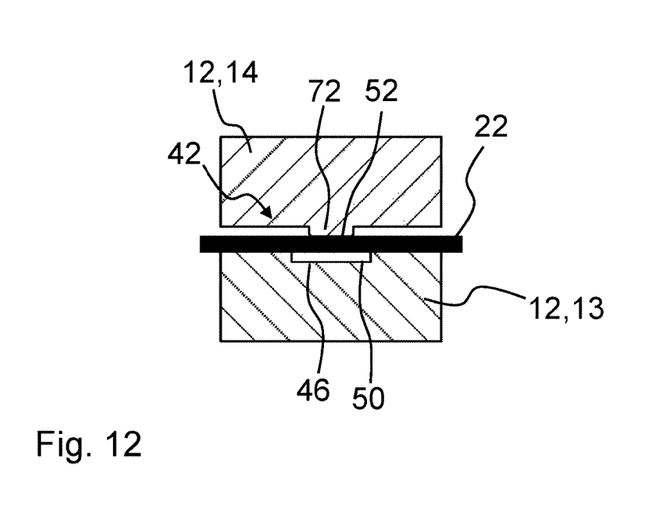
FIG. 12 shows in schematic illustration a joining region with clamped switching film according to a further embodiment of the invention.

In FIG. 12, a schematic illustration of a joining region 42 with clamped switching film 22 according to further embodiment of the invention is illustrated. In this context, the switching film 22 is clamped by an elevation 72 in the joining surface 52 of the second housing part 14, which engages an oppositely positioned groove 46 of the joining surface 50 of the first housing part 14, and is secured for fixation of the switching film 22 during compression of the two housing parts 13, 14.

Figure 13:
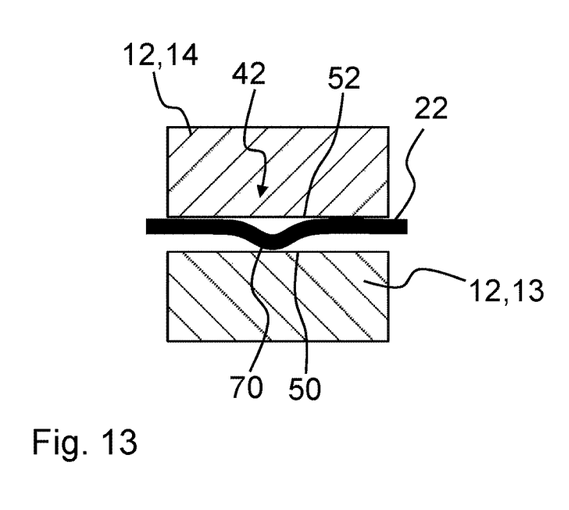
FIG. 13 shows a schematic illustration of a joining region with clamped switching film according to a further embodiment of the invention.

FIG. 13 shows a schematic illustration of a joining region 42 with clamped switching film 22 according to a further embodiment of the invention. In this embodiment, the switching film 22 itself has an embossment 70 as an elevation by means of which the switching film 22 can be clamped advantageously between the joining surfaces 50, 52 of the two housing parts 13, 14.

Figure 14:
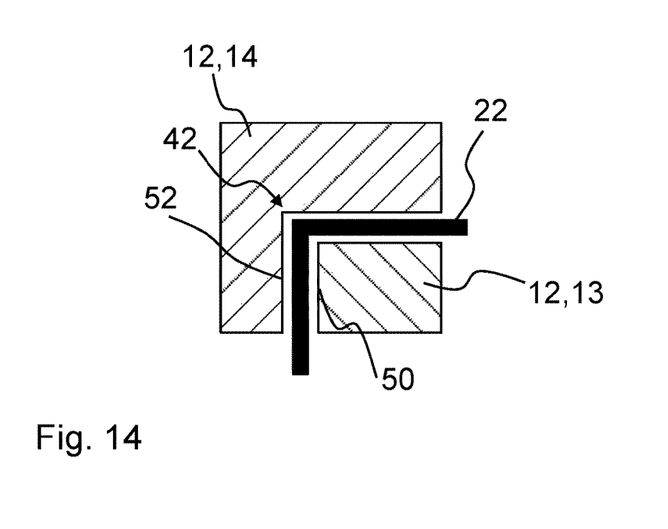
FIG. 14 is a schematic illustration of a joining region with switching film clamped across a corner region according to a further embodiment of the invention.

In FIG. 14, a schematic illustration of a joining region 42 with switching film 22 clamped across a corner area according to a further embodiment of the invention is illustrated. The second housing part 14 engages in this context with a radial circumferential rim across the first housing part 13 so that the switching film 22, when it is placed across the first housing part 13 and the second housing part 14 is pushed across, is bent in axial direction and clamped in this way. In this way, a reliable fluid-tight connection of the two housing parts 13, 14 and sealing of the opening cross section 40 can be achieved.

Figure 15:
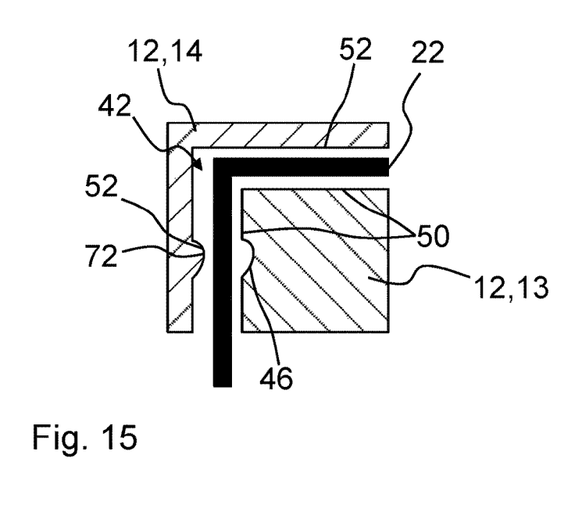
FIG. 15 is a schematic illustration of a joining region with switching film clamped across a corner region according to a further embodiment of the invention.

FIG. 15 shows as an expansion to the embodiment illustrated in FIG. 14 a schematic illustration of the joining region 42 with switching film 22 clamped across a corner area with additional fixation. In this context, the radial circumferential rim of the second housing part 14 comprises a radial inwardly oriented elevation 72 which is complementary to a circumferential groove 46 in the first housing part 13. When the switching film 22 is placed across the first housing part 13 and the second housing part is pushed across, the switching film can be clamped by the elevation 72 and the groove 46 so that in this way a reliable fixation of the switching film 22 can be achieved.

While specific embodiments of the invention have been shown and described in detail to illustrate the inventive principles, it will be understood that the invention may be embodied otherwise without departing from such principles.

What is claimed is:

1. A unit for regulating or controlling a fluid pressure of a fluid, the unit comprising:
 a housing comprising at least one housing part having an inlet port and an outlet port and comprising:
  a first housing part, having:
   a valve seat;
   a first chamber;
  a second housing part arranged forming a cover over the first chamber of the first housing part, the second housing part having:
   a second chamber;
  a switching film arranged between and connected to the first and second housing parts, the switching film covering an opening cross section between the first chamber and the second chamber, forming a fluid-tight closure sealing the first chamber from the second chamber;
  wherein the switching film is comprised of thermoplastic synthetic material;
  wherein a central portion of the switching film forms a closure region, the closure region closing against the valve seat when the switching film switches by executing a bending movement towards the valve seat in response to a pressure difference between the first chamber and the second chamber;
  a coil spring arranged in the first chamber, the coil spring having a first end at and surrounding the valve seat and an second end at and acting on the closure region of the switching film, the coil spring urging the closure region away from the valve seat;
  wherein the switching film is configured to switch at pressure differences of 1 to 250 mbar relative to an ambient pressure acting on the switching film and configured to regulate, release or block a flow of the fluid between the inlet and the outlet for the fluid.

2. The unit according to claim 1, wherein
 the at least one housing part comprises
  at least one circumferential joining surface arranged radial outwardly,
  wherein the switching film is connected to the at least one circumferential joining surface of the at least one housing part.

3. The unit according to claim 2, wherein
 the switching film is connected fixedly and fluid-tightly to the at least one circumferential joining surface of the at least one housing part.

4. The unit according to claim 2, wherein
 a radial outwardly positioned joining region of the switching film is fluid-tightly pressed against the at least one circumferential joining surface of the at least one housing part.

5. The unit according to claim 1, wherein
 the switching film comprises a radial outwardly positioned joining region that is glued to the at least one housing part.

6. The unit according to claim 5, wherein
the radial outwardly positioned joining region of the switching is glued with material fusion and/or with form fit to the at least one housing part.

7. The unit according to claim 1, wherein
the switching film comprises a radial outwardly positioned joining region that is connected to the at least one housing part by at least partial melting of the joining region of the switching film.

8. The unit according to claim 7, wherein
the joining region of the switching film is connected by material fusion and/or with form fit to the at least one housing part.

9. The unit according to claim 1, wherein
the switching film comprises
a radial outwardly positioned joining region and
wherein the at least one housing part comprises
at least one circumferential joining surface arranged radial outwardly,
wherein the joining region of the switching film is connected to the at least one housing part by at least partial melting of the at least one circumferential joining surface of the at least one housing part.

10. The unit according to claim 9, wherein
the joining region of the switching film is connected by material fusion and/or with form fit to the at least one housing part.

11. The unit according to claim 1, wherein
the switching film comprises
a radial outwardly positioned joining region and
wherein the at least one housing part comprises
at least one circumferential joining surface arranged radial outwardly,
wherein the joining region of the switching film is connected to the at least one housing part by at least partial melting of the at least one circumferential joining surface of the at least one housing part and of the joining region of the switching film.

12. The unit according to claim 11, wherein
the joining region of the switching film is connected by material fusion and/or with form fit to the at least one housing part.

13. The unit according to claim 1, wherein
the at least one housing part comprises
at least one circumferential joining surface arranged radial outwardly,
wherein a radial outwardly positioned joining region of the switching film, on at least one side which is facing the at least one circumferential joining surface, comprises
a connecting element and
the connecting element is connected to the at least one housing part.

14. The unit according to claim 13, wherein
the connecting element is connected to the at least one housing part with material fusion and/or form fit.

15. The unit according to claim 13, wherein
at least one of the components selected from the group consisting of
the connecting element,
the at least one housing part, and
the switching film
is embodied as a sintered part and/or as a 3D printed part.

16. The unit according to claim 1, wherein
a radial outwardly positioned joining region of the switching film is connected to the at least one housing part by a foam material.

17. The unit according to claim 16, wherein
the radial outwardly positioned joining region of the switching film is connected with material fusion and/or with form fit to the at least one housing part by the foam material.

18. The unit according to claim 1, wherein
the at least one housing part comprises
at least one circumferential joining surface arranged radial outwardly,
wherein a radial outwardly positioned joining region of the switching film, on at least one side that is facing the at least one circumferential joining surface of the at least one housing part, comprises
a connecting element that is connected to the at least one housing part.

19. The unit according to claim 18, wherein
the connecting element is connected to the at least one housing part by gluing with material fusion and/or form fit, by welding, or by being pressed on.

20. The unit according to claim 18, wherein
the connecting element is formed of synthetic material and/or is formed by injection molding on the joining region of the switching element.

21. The unit according to claim 1, wherein the thermoplastic synthetic material is polyamide or polypropylene or polyethylene.

22. The unit according to claim 1, wherein the thermoplastic synthetic material contains a filler.

23. The unit according to claim 1, wherein
the unit is a pressure regulating valve for pressure regulation of an internal combustion engine and/or of a crankcase of an internal combustion engine.

24. A method for fluid-tightly connecting a switching film to a unit according to claim 1, for regulating or controlling a fluid pressure of a fluid,
the method comprising:
placing at least one radial outwardly positioned joining region of the switching film onto at least one joining surface of the at least one housing part;
connecting fluid-tightly the at least one radial outwardly positioned joining region to the at least one joining surface.

25. The method according to claim 24, further comprising,
after placing the at least one radial outwardly positioned joining region of the switching film onto at least one joining surface of the at least one housing part, placing a second housing part onto the switching film to form the housing,
wherein the at least one radial outwardly positioned joining region of the switching film, when the housing is closed, is connected in a region of the at least one joining surface.

* * * * *